United States Patent

Simonetti

[11] Patent Number: 5,996,938
[45] Date of Patent: Dec. 7, 1999

[54] APU COMPARTMENT DRAIN SYSTEM

[75] Inventor: Joseph L. Simonetti, Cave Creek, Ariz.

[73] Assignee: AlliedSignal Inc., Morris Township, N.J.

[21] Appl. No.: 09/042,203

[22] Filed: Mar. 13, 1998

[51] Int. Cl.$^6$ .................................................. B64D 47/00
[52] U.S. Cl. ....................................................... 244/129.1
[58] Field of Search ........................... 244/129.1, 118.5, 244/58; 137/244, 81.1; 458/77

[56] References Cited

U.S. PATENT DOCUMENTS

| | | |
|---|---|---|
| 2,446,013 | 5/1948 | Kuyper . |
| 3,103,229 | 9/1963 | Smith . |
| 3,344,602 | 10/1967 | Davies et al. . |
| 3,371,482 | 3/1968 | Camboulives et al. . |
| 3,498,056 | 3/1970 | Avery . |
| 3,556,444 | 1/1971 | Kopp . |
| 3,638,905 | 2/1972 | Ferris . |
| 3,808,796 | 5/1974 | Spears, Jr. . |
| 3,841,089 | 10/1974 | Clark . |
| 4,506,851 | 3/1985 | Gupta et al. ......................... 244/129.1 |

Primary Examiner—Galen L. Barefoot
Attorney, Agent, or Firm—Robert Desmond, Esq.

[57] ABSTRACT

An APU compartment drain system is provided that ensures thorough draining of fluids from the compartment that may otherwise accumulate therein. Such drainage is achieved despite the presence of a predetermined range of negative pressure differentials across the compartment. In accordance with one embodiment of the invention, a floor disposed along the tailcone lower skin is configured to collect any and all liquids that may leak or otherwise drop from the APU. A drain tube is in fluid communication at its upper end to the floor and at its lower end to a check valve selectively open and placed as closely as possible to the aircraft overboard drain port. Liquids collected by the floor are gravitationally directed into the drain tube upper end. The check valve is configured to be open to fluid drainage from the tube out of the drain port when the pressure head of fluid upstream of the check valve exceeds fluid pressure at the drain port due to aircraft or APU operating conditions. The check valve is configured to be closed to fluid drainage from the tube out of the drain port when the fluid pressure at the drain port due to aircraft or APU operating conditions exceeds the pressure head of fluid upstream of the check valve. Once the maximum negative pressure differential encountered by a particular aircraft is determined, the check valve is placed relative to the floor pan such that fluid completely filling only the tube will provide the maximum pressure head necessary to open the check valve and provide draining.

17 Claims, 3 Drawing Sheets

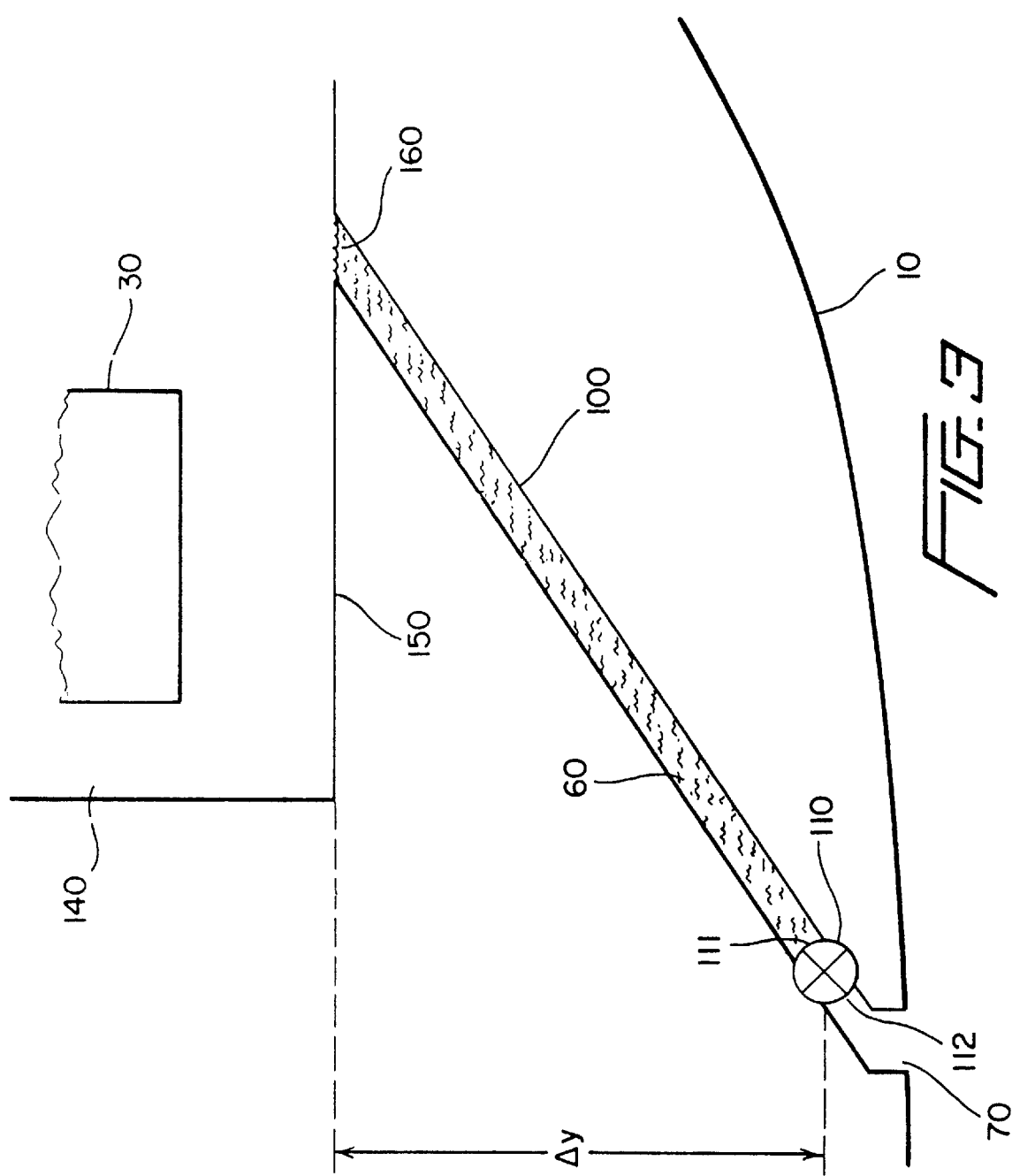

APU COMPARTMENT DRAIN SYSTEM

FIELD OF THE INVENTION

The present invention relates to aircraft auxiliary power units in general and to an aircraft auxiliary power unit compartment drainage system, in particular.

BACKGROUND OF THE INVENTION

Most modern aircraft include an auxiliary power unit ("APU") as standard operational equipment. Typically, the APU is positioned in a compartment located in the tailcone portion of an aircraft. Federal Aviation Administration regulations require a means for overboard draining of all flammable liquids that might be leaked by the APU or otherwise may accumulate in the APU compartment. Heretofore, the draining method most commonly employed included one or more drainage tubes connecting the compartment to an overboard drain port. Gravity flow was relied upon to force the liquids through the drainage tubes and drain port.

Unfortunately, a negative pressure differential often exists within the compartment, that is, pressure within the compartment is often lower than the pressure at the aircraft drain port. In such instances, reliance upon gravity flow is generally insufficient inasmuch as the liquid pressure head needed to overcome the negative pressure differential may entail a dangerously large upstream liquid accumulation. Accordingly, what is needed is an APU compartment drainage system that ensures thorough compartment draining under maximum negative pressure differential conditions for any given aircraft.

SUMMARY OF THE INVENTION

According to the principles of the present invention, an APU compartment drain system is provided that ensures thorough draining of fluids from the compartment that may otherwise accumulate therein. Such draining is achieved despite the presence of a predetermined range of negative pressure differentials across the compartment.

An APU compartment drain system in accordance with one embodiment of the invention includes a fluid collector, such as a floor disposed along the tailcone lower skin and configured to collect any and all liquids that may leak or otherwise drop from the APU. A conduit, such as a fireproof drain tube is in fluid communication at its upper end to the floor. At its lower end, the conduit is in fluid communication with a flow restrictor, such as a fireproof check valve placed as closely as possible to the aircraft overboard drain port. Liquids collected by the floor are gravitationally directed into the drain tube upper end. In an alternative embodiment, a false floor having at least one aperture is placed as high above the forward tailcone lower skin as possible. Liquids collected by the false floor are gravitationally directed through the aperture into the drain tube upper end. In either case, the tube allows fluid drainage from the compartment into the check valve.

The check valve is configured to be open to fluid drainage from the tube out of the drain port when the pressure head of fluid upstream of the check valve exceeds fluid pressure at the drain port due to aircraft or APU operating conditions. The check valve is configured to be closed to fluid drainage from the tube out of the drain port when the fluid pressure at the drain port due to aircraft or APU operating conditions exceeds the pressure head of the fluid upstream of the check valve. The check valve may be configured to close or open if the aforementioned pressures are equal. The function of the check valve is to prevent atmospheric pressure from impeding the downward flow of fluid in the tube. In performing this function, the check valve maximizes the amount of fluid present in the tube, thereby minimizing fluid levels in the compartment and maximizing the fluid pressure head at the check valve. In designing a compartment drain system, once the maximum negative pressure differential encountered by a particular aircraft is determined, the check valve is placed relative to the floor pan such that fluid completely filling only the tube will provide the maximum pressure head necessary to open the check valve and provide draining. Accordingly, even under maximum negative pressure differential conditions, little, if any, fluid will accumulate in the compartment.

BRIEF DESCRIPTION OF THE DRAWING

The invention will be better understood from a reading of the following detailed description taken in conjunction with the drawing in which like reference designators are used to designate like elements, and in which:

FIG. 3 is a cross-sectional view of an APU compartment drainage system incorporating features of an alternative embodiment of the present invention.

DETAILED DESCRIPTION

Figure 1:
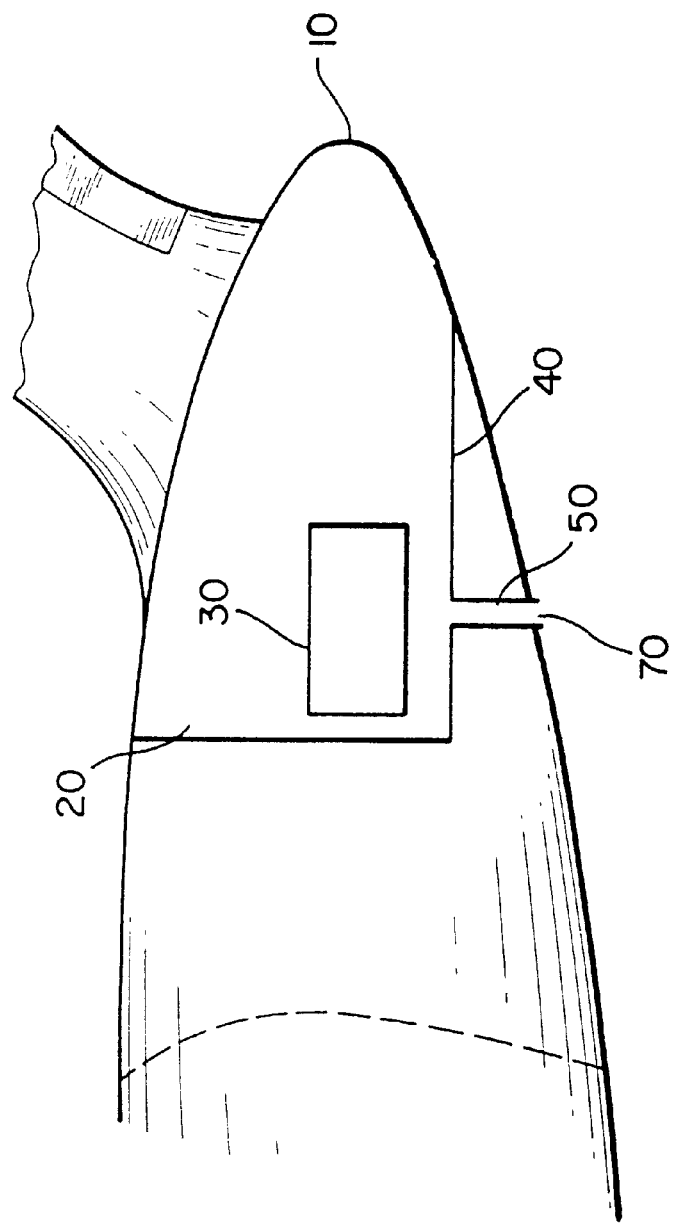
FIG. 1 is a cross-sectional view of an APU compartment drainage system according to the prior art.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than are shown and the terms so used are only for the purpose of describing relative positions and are interchangeable under appropriate circumstances.

FIG. 1 illustrates in cross-section an aircraft tailcone section 10 within which is housed an APU compartment 20 containing an APU 30. In prior art drainage configurations, fluids leaked by the APU 30 drop to compartment floor 40. Fluids accumulating in the compartment 20 eventually enter drainage tube 50 and, under appropriate conditions, exit the aircraft to atmosphere via overboard drain port 70. However, pressure at the drain port 70 frequently exceeds pressure in the compartment 20 in which case flow out of the drain port 70 may be significantly impeded. In fact, under relatively high negative pressure differential conditions, fluid within the compartment 20 may be unable to enter the tube 50 at all, causing unwanted accumulation of fluid within the compartment 20.

Figure 2:
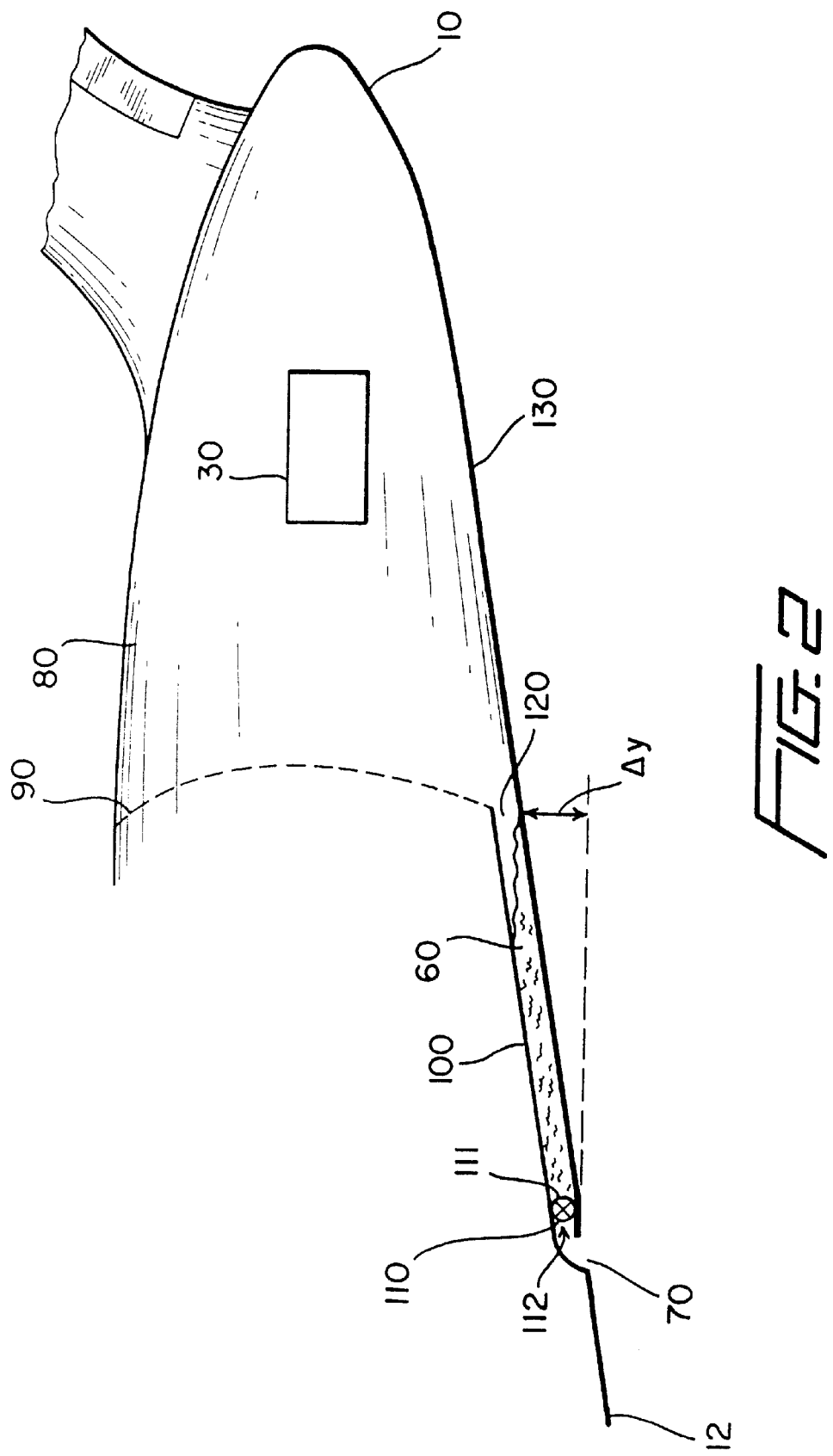
FIG. 2 is a cross-sectional view of an APU compartment drainage system incorporating features of the present invention.

FIG. 2 illustrates in cross-section one embodiment incorporating features of the present invention wherein an APU compartment 80 housing an APU 30 is bounded by a rearward aircraft fire wall 90 and the aircraft tailcone section 10 aft of the firewall 90. A drain tube 100 is disposed along the bottom of the fuselage 12 forward of and extending from the fire wall 90. The tube 100 is open at its upper end while its lower end is connected to and in fluid communication with the inlet 111 of a check valve 110. An opening 120 at the bottom of fire wall 90 allows fluid communication between compartment 80 and tube 100. The outlet 112 of check valve 110 is in selective fluid communication with the atmosphere at overboard drain port 70. The check valve 110 is configured to be closed during normal operating conditions when there is no fluid leakage present, with the valve 110 opening to allow fluid drainage from the tube 100 out of the drain port 70 when the pressure head of fluid upstream of the check valve 110 exceeds the air pressure at the drain port 70. The check valve 110 prevents drainage from the tube 100 out of the drain port 70 when the air pressure at the drain port 70 exceeds the pressure head of fluid upstream of the check valve 110 and, more importantly, prevents air pressure from causing fluid backflow through tube 100. The check valve 110 may be configured to close or open if the aforementioned pressures are equal.

Floor 130 collects and directs fluids leaked from APU 30 towards the fire wall 90 where the fluids enter the tube 100. Fluids entering the tube 100 may flow to the check valve 110 where, if the check valve 110 is closed, the fluids will accumulate to form a fluid column 60 having a vertical height (y). The column of fluid exerts a pressure head on the check valve inlet 111 that is directly proportional to (y). In accordance with the present invention, during the design phase an aircraft is operationally tested to determine the maximum negative differential pressure encountered by the compartment 80. The check valve 110 is then placed to the floor 130, in general, and the opening 120, in particular, such that fluid completely filling only the tube 100 will provide the maximum pressure head necessary to open the check valve 110 and provide overboard draining under all conditions without permitting fluid to accumulate on floor 130.

FIG. 3 illustrates in cross-section the principles according to a second embodiment of the present invention wherein an APU compartment 140 housing an APU 30 is disposed within an aircraft tailcone section 10. A false floor 150 having an aperture 160 is disposed below the APU 30. The drain tube 100 is open at its upper end and is connected to false floor 150 such that the upper end is in fluid communication with compartment 140. The lower end of tube 100 is in fluid communication with the inlet 111 of check valve 110. In either embodiment of the present invention, the tube 100 preferably has a diameter of at least one inch. The outlet 112 of check valve 110 is in selective fluid communication with overboard drain port 70. In either embodiment of the present invention, the check valve 110 preferably is disposed at least 8.5 inches vertically below the floor 130 or false floor 150. The check valve 110 is configured to be normally closed, with the check valve 110 opening to permit fluid drainage from the tube 100 out of the drain port 70 when the pressure head of fluid upstream of the check valve 110 exceeds the air pressure at the drain port 70. The closed check valve 110 prevents fluid drainage from the tube 100 out of the drain port 70 when the fluid pressure at the drain port 70 exceeds the pressure head of fluid upstream of the check valve 110 and therefore prevents a backflow of air and fluid into the APU compartment 140. The check valve 110 may be configured to close or open if the aforementioned pressures are equal.

The false floor 150 collects and permits fluids leaked from APU 30 to flow through the aperture 160 where the fluids enter the tube 100. Fluids entering the tube 100 may flow to the check valve 110 where, if the check valve 110 is closed, the fluids will accumulate to form a fluid column 60 having an effective height (y) directly proportional to the pressure head existing at the check valve inlet 111. In accordance with the present invention, an aircraft is operationally tested to determine the maximum negative differential pressure encountered by the compartment 140. The check valve 110 is then placed relative to the aperture 160 such that fluid completely filling only the tube 100 will provide the maximum pressure head necessary to open the check valve 110 and provide overboard draining.

It is important to note that application of the principles embodied by the present invention is not limited to aircraft APU compartments. The principles embodied by the present invention may be applied to any body requiring drainage and within which a variable and/or negative pressure differential occurs.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An apparatus for draining fluid from an aircraft auxiliary power unit compartment to atmosphere comprising:

a false floor, said false floor placed below the auxiliary power unit, said false floor configured to collect fluids released by the auxiliary power unit;

a tube comprised of a material that is at least fire resistant, said tube having first and second ends, said first end in fluid communication with said false floor; and a check valve comprised of a material that is at least fire resistant having an inlet and an outlet, said inlet being attached to and in fluid communication with said tube second end, said outlet being in fluid communication with the atmosphere, said check valve being configured to close when fluid pressure at said outlet exceeds fluid pressure at said inlet, and to open when fluid pressure at said inlet at least equals fluid pressure at said outlet.

2. An apparatus for draining fluid from an aircraft auxiliary power unit compartment to atmosphere comprising:

at least one fluid collector configured to collect fluids released by the auxiliary power unit;

at least one conduit comprised of a material that is at least fire resistant having first and second ends, said first end in fluid communication with said collector;

at least one flow restrictor comprised of a material that is at least fire resistant having an inlet and an outlet, said inlet being attached to and in fluid communication with said conduit second end, said outlet being in fluid communication with the atmosphere; and said flow restrictor is configured to close when fluid pressure at said outlet of said flow restrictor exceeds fluid pressure at said inlet of said flow restrictor, said flow restrictor further configured to open when fluid pressure at said inlet exceeds fluid pressure at said outlet.

3. The apparatus of claim 2, wherein:
said fluid collector includes at least one aperture.

4. The apparatus of claim 2, wherein:
said fluid collector further comprises a floor pan placed below the auxiliary power unit.

5. The apparatus of claim 4, wherein:
said floor pan further comprises a false floor.

6. The apparatus of claim 2, wherein:
said conduit further comprises a tube.

7. The apparatus of claim 2, wherein:
said conduit has a diameter of at least one inch.

8. The apparatus of claim 2, wherein
said flow restrictor is configured to open when fluid pressure at said inlet equals fluid pressure at said outlet.

9. The apparatus of claim 2, wherein:

said flow restrictor further comprises a check valve.

10. The apparatus of claim 2, wherein:

said flow restrictor is disposed at least 8.5 inches vertically below said fluid collector when the aircraft is in level flight.

11. A method of draining fluid from an aircraft auxiliary power unit compartment to atmosphere comprising the steps of:

collecting fluids released from the auxiliary power unit in a fluid collector situated in the auxiliary power unit compartment;

collecting fluids from said fluid collector in an elongate conduit so as to form a fluid column having a pressure gradient;

releasing fluid from said conduit to the environment when the sum of the pressure in the auxiliary power unit compartment plus the gradient exceeds atmospheric pressure.

12. A method in accordance with claim 11, wherein:

said fluid collector includes at least one aperture.

13. A method in accordance with claim 11, wherein:

said fluid collector further comprises a floor pan placed below the auxiliary power unit.

14. A method in accordance with claim 13, wherein:

said floor pan further comprises a false floor.

15. A method in accordance with claim 11, wherein said conduit further compromises a tube that is at least fire resistant.

16. A method of draining fluid from an aircraft auxiliary power unit compartment to atmosphere comprising the steps of:

placing a false floor in the auxiliary power unit compartment, said false floor placed below the auxiliary power unit, said false floor configured to collect fluids released by the auxiliary power unit;

placing a tube proximal to the compartment, said tube comprised of a material that is at least fire resistant and having first and second ends, said first tube end thereby being in fluid communication with said false floor;

attaching a check valve comprised of a material that is at least fire resistant and having an inlet and an outlet to said second tube end, said inlet thereby being in fluid communication with said second tube end, said check valve being configured to close when fluid pressure at said outlet exceeds fluid pressure at said inlet, said check valve further configured to open when fluid pressure at said inlet exceeds or equals fluid pressure at said outlet; and positioning said outlet in fluid communication with the atmosphere.

17. A method in accordance with claim 16 comprising:

determining the maximum fluid pressure at said outlet during aircraft operation; and positioning said check valve relative to said false floor such that the fluid pressure head at said inlet due to fluid in said tube exceeds the maximum fluid pressure at said outlet.

* * * * *